United States Patent [19]

Garbuny

[11] 4,166,951
[45] Sep. 4, 1979

[54] ISOTOPE ENRICHMENT
[75] Inventor: Max Garbuny, Churchill, Pa.
[73] Assignee: Westinghouse Electric Corp., Pittsburgh, Pa.
[21] Appl. No.: 787,235
[22] Filed: Apr. 13, 1977
[51] Int. Cl.² ............................................. H01J 35/34
[52] U.S. Cl. ................................... 250/284; 250/282; 250/423 P
[58] Field of Search ..................... 250/423 P, 283, 284, 250/282; 204/DIG. 11

[56] References Cited
U.S. PATENT DOCUMENTS
3,406,349  10/1968  Swain et al. ....................... 250/423 P OTHER PUBLICATIONS
"The Application of Lasers to Isotope Separation", Moore, Acc. of Chem. Res., vol. 6, pp. 323–328, 1973.
"Enriching Isotopes with Lasers", Hecht, Analog, No. 9, pp. 54–68, Sep. 1976.
"Isotope Separation Using Laser Light", Hodgson et al., IBM Tech. Dis. Bulletin, vol. 17, No. 11, Apr. 1975, pp. 3501–3502.

Primary Examiner—Bruce C. Anderson
Attorney, Agent, or Firm—D. C. Abeles; Z. L. Dermer

[57] ABSTRACT

A method for deriving, from a starting material including an element having a plurality of isotopes, derived material enriched in one isotope of the element. The starting material is deposited on a substrate at less than a critical submonatomic surface density, typically less than $10^{16}$ atoms per square centimeter. The deposit is then selectively irradiated by a laser (maser or electronic oscillator) beam with monochromatic coherent radiation resonant with the one isotope causing the material including the one isotope to escape from the substrate. The escaping enriched material is then collected. Where the element has two isotopes, one of which is to be collected, the deposit may be irradiated with radiation resonant with the other isotope and the residual material enriched in the one isotope may be evaporated from the substrate and collected.

12 Claims, 3 Drawing Figures

ISOTOPE ENRICHMENT

REFERENCE TO RELATED DOCUMENTS

1. R. W. Ditchburn—Proceedings of the Royal Society A 141,169 (1933)
2. O Heavens—Optical Properties of Thin Solid Films, Academic Press (1955)
3. Irving Langmuir—The Collected Works of Irving Langmuir C. G. Suits Ed., Vol. 3 Thermionic Phenomena, Pergaman Press (1961)

BACKGROUND OF THE INVENTION

This invention relates to the art of enriching materials including isotopic elements, in selected isotopes of the elements.

In isotope separation an important parameter is the separation coefficient. Separation coefficient is a measure of the enrichment in a selected isotope achieved during a single separation operation or a plurality of cascaded operations. It can be defined by the equation:

$$\alpha = \frac{(C^I/C^{II})_{FINAL}}{(C^I/C^{II})_{INITIAL}} \tag{1}$$

where $C^I$ is the concentration of the selected isotope, of the isotopic element, whose enrichment is sought and $C^{II}$ is the concentration of the other isotopes of the element. The denominator $(C^I/C^{II})_{INITIAL}$ is the concentration ratio of the starting material, the numerator $(C^I/C^{II})_{FINAL}$ is the concentration ratio for the derived material. In this specification and in the claims the reference to "INITIAL" or "starting" or "first material" is intended to mean, not only a natural such material, but any material which has been previously enriched in an isotype and is processed for higher enrichment. The reference to "material" means a compound or compounds or minerals including the isotopic element as a component or the element alone. Where there are more than two isotopes, $C^{II}$ is the concentration of all the non-selected isotopes. Where, as in the case of uranium, there are only two isotopes, $C^{II}$ is the concentration of the non-selected isotope, for example $U^{238}$ where $U^{235}$ is the selected isotope.

Another factor governing isotope separation is the yield. The yield is the actual quantity or mass of enriched material which can be derived from an isotopic separation or from a cascaded series of such operations.

Isotope separation in accordance with the teachings of the prior art has failed to combine high separation coefficient and high yield except at excessively high cost. The electromagnetic method can be carried out at high separation coefficient but its yield is very small because the ion beam current which carries the isotopes must be small and must be passed through a narrow aperture. This method can yield only a fraction of a microgram in a single deposit operation for appreciable deposit requires many operations carried on for very long intervals. Methods capable of high yield, such as diffusion, rely on very small differences in the selective transport through the diffusion medium and have low separation coefficient. Selective vibrational excitation with tuned lasers in various ways has also been proposed. Typical of these methods is the two-step photodissociation. These methods are confronted with the requirement for isolation of the excited molecules from collisional excitation transfer and excitation exchange with non-selected isotopes and have failed to yield effective isotope enrichment.

It is an object of this invention to overcome the deficiencies of the prior art and to provide a method of enrichment which shall combine high separation coefficient with high yield.

SUMMARY OF THE INVENTION

It has been realized in arriving at this invention that to achieve high separation coefficint together with high yield, selective vibrational excitation mmust be combined with isolation of the excited molecules or atoms of a selected isotope from the influences of neighboring molecules or atoms of the other isotopes.

It was discovered by Wood, Knudsen, Estermann and others (References 1 and 2) that in the deposit of vapor of a material on a metal substrate there exists, at a given vapor flux density (herein called $\Psi$), a critical temperature of the substrate above which the vapor will not condense on the substrate. The flux density, $\Psi$, is the number of molecules or atoms of the vapor arriving on unit area of the substrate per unit time. This critical temperature increases with increasing flux density in a sharply defined and reproducible manner.

Corresponding to a low flux density, depositing a submonatomic layer of a material on the substrate, the critical temperature is also relatively low, substantially lower than the vaporization temperature of a thick deposit of the material. Typically the flux density is such as to deposit less than $10^{16}$ molecules per square centimeter of substrate surface.

This phenomenon is explained by a theory of J. Frenkel (References 1 and 2). Frenkel's theory starts with the concept that the vapor particles (molecules or atoms) arriving on the substrate, before they agglomerate into a complete monatomic (monomolecular) film layer oscillate at a period (herein called $\tau_o$) in the infrared around a mean position at which the potential energy of bonding is at a predetermined magnitude (herein called $U_o$). In some cases, the particles also glide on the surface of the substrate colliding with each other after a certain mean free path. So long as the flux density is so small (that is the distance or the mean-free path of the particles on the substrate is so large) that the particles remain isolated from each other, the particles remain in an oscillatory state near the substrate for a mean life time $\tau$ and then, depending on the temperature of the substrate, they escape from the substrate and join the vapor phase. Based on gas kinetics and thermodynamics.

$$\tau = \tau_o \exp(U_o/kT) \tag{2}$$

where
exp = is the exponential function
k = Boltzman's constant
T = is the absolute temperature of the substrate in degrees Kelvin Equation 2 is the relationship derived on the basis of Frenkel's theory. If the vapor flux density is sufficiently high, particles during their oscillation agglomerate with neighboring particles and the agglomerate acquires a higher bonding energy $U_o + \Delta U_o$ per particle. In this case a continuous condensed film builds up on the substrate. If the temperature T is sufficiently low $\tau$ becomes high and a condensed film also builds up.

In accordance with this invention reliance is placed on the converse of the Wood, Knudsen, Estermann effect described. The binding energy of the molecules including a selected isotope, deposited at a critical submonatomic (premonomolecular layer) surface density on a substrate, is decreased selectively by irradiating the deposit, in its initial premonomolecular surface density, with radiation resonant with the frequency, $v$, of the selected isotope.
where $$v = U_1/h$$

$U_1$ is the photon energy of the radiation
$h$ = Planck's constant
Under these circumstances:

$$\tau^I = \tau_o^I \exp\left[(U_o - U_1)/kT\right]$$

and $$\tau^{II} = \tau_o^{II} \exp(U_o/kT)$$

where $\tau^I$ and $\tau^{II}$ are the respective life times of the resonant and non-resonant particles and $\tau_o^I$ and $\tau_o^{II}$ are respectively the periods of vibration of the resonant and non-resonant particles. The resonance for isotope I is very sharp so that isotope II is not affected by the excitation of I.

$$\frac{\tau^I}{\tau^{II}} = \frac{\tau_o^I}{\tau_o^{II}} \frac{\exp\left[(U_o - U_1)/kT\right]}{\exp(U_o/kT)} \quad (3A)$$

$\tau_o^I$ and $\tau_o^{II}$ differ by a small magnitude. For example, for $U^{235}$ and $U^{238}$ atoms $\tau_o^I$ and $\tau_o^{II}$ differ by only 0.64 percent. Equation 3A becomes $$\frac{\tau^I}{\tau^{II}} = \exp(-U_1/kT) \quad (4)$$

This invention is a method based on the above analysis. In the practice of this method, (1) the material processed is deposited as a subcritical density film; i.e., as an "invisible" submonatomic or submonomolecular film, on a substrate.

(2) the deposit is selectively excited by radiation sharply resonant with the selected isotope, (3) the excited particles are selectively removed by evaporation.

The selective increase of the energy (potential energy) of the deposited material can be achieved in several ways:

(1) By radiation resonant with the vibration frequency of the selected isotope; i.e. at the frequency $1/\tau_o$ (2) By radiation resonant with the vibration frequency of the molecules including the selected isotope. In this case the internal excitation of the molecules must be quenched (by transfer to the bonding energy) soon enough to release the selected molecules.

BRIEF DESCRIPTION OF THE DRAWINGS

For a better understanding of this invention, both as to its organization and as to its method of operation, together with additional objects and advantages thereof, reference is made to the following description, taken in connection with the accompanying drawing, in which.

DETAILED DESCRIPTION OF INVENTION

Figure 1:
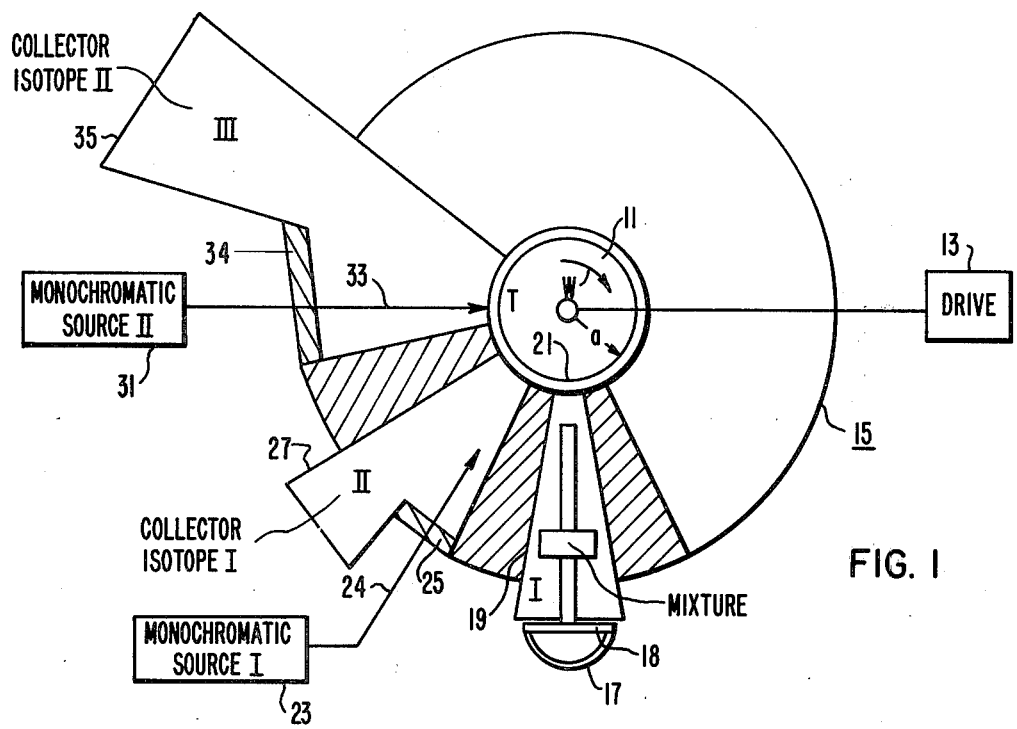
FIG. 1 is a diagrammatic view showing apparatus for practicing this invention.

The apparatus shown in FIG. 1 includes a drum 11 of cylindrical form. Typically, for processing uranium, the drum 11 may be composed of tungsten. The drum may also be composed of other materials or materials coated with a layer such as of beryllium or an oxide. The drum 11 has a radius a and is maintained at a temperature T. A temperature regulator (not shown) is provided for regulating the temperature of the drum. The drum 11 is rotated at a high angular velocity, typically 6000 revolutions per minute, by a drive 13.

The drum 11 is rotated within a vacuum-tight cylindrical enclosure 15 which is evacuated to a pressure of about $10^{-5}$ to $10^{-9}$ microns and sealed off. A plurality of crucibles 17 (only one shown) are angularly spaced around the drum. The crucibles 17 contain the material to be deposited, and in the practice of this invention are heated to deposit the material on the surface of the drum 11 at a molecular flux density $\Psi$ below the critical flux density at the temperature T.

$\Psi$ = number of incident, but not reflected molecules, deposited per second, per square centimeter Each crucible 17 is sealed vacuum tight in a sector-shaped shell 19 which extends to the drum 11. The vapor from each crucible 17 flows through an aperture 18. The vapor is deposited on an arcuate strip 21 of the drum 11 having a width d and an axial length L (not shown).

Spaced a small angle from each crucible 17 and shell 19 there is a source 23 (a laser or maser or electron-beam oscillator) of monochromatic, coherent radiation resonant with a selected isotope of the deposit or with molecules of the deposit including the selected isotope. The radiation is projected as a beam 24 on the drum through a transparent window 25 in the container 15. The beam should preferably have a cross section such that the area of the drum 11 (d×L) on which there is a deposit is covered by the beam. A collector 27 sealed to the container 15 is in communication with the region of the drum irradiated by source 23. Spaced a small angle from the collector 27 there is a second source 31 of monochromatic, coherent radiation resonant with another isotope of the vapor derived from crucible 17. A beam 33 from this second source is projected on the drum 11 through a window 34. The irradiated surface is in communication with another collector 35 sealed to the container 15. There may be additional sources and collectors for additional isotopes. Alternatively, the source 31 may be replaced by a heating source which vaporizes the residual deposit on the drum 11 into collector 35. A plurality of sets of crucibles 17, sources 23, collectors 27, sources 31 and collectors 35 may be disposed around the drum 11, to maximize the derivation of enriched material.

As the drum 11 rotates, it receives a submonatomic or submonomolecular deposit from the crucible 17. As the deposit is rotated, it receives monochromatic, coherent radiation from source 23. Typically, the radiation from source 23 is resonant with the frequency of vibration of the selected isotope, for example $U^{235}$. As a result, about $\frac{2}{3}$ of the deposit on arc strip 21 is collected by collector 27. To achieve this purpose, the speed of rotation $\omega$ of the drum 11 must be such that the deposit remains in the region where the deposit may flow to the collector for a time interval equal to or exceeding slightly $\tau^I$ for the isotope. That is $(d'/a\omega)$ must be equal to or more than $\tau^I$, where d' is the width of the deposit circumferentially around the drum 11 and, as indicated, a is the radius of the drum. The remaining adsorbed deposit is carried into the sector covered by source 31 and collector 35, where it receives radiation from source 31 to remove the residual deposit. As stated, source 31 may radiate non-selective radiation vaporizing the deposit. It may also radiate selective radiation, for example tuned to the frequency of $U^{238}$ so that the residual isotope $U^{235}$ remains on the drum 11.

In dealing with uranium to obtain an enrichment of $U^{235}$, the source 23 may supply radiation resonant with $U^{238}$. With the $U^{238}$ evaporated, there is an enrichment in $U^{235}$ which may be enhanced by subjecting the residue deposit to radiation tuned to the $U^{235}$ isotope from source 31.

THEORETICAL ASPECTS OF INVENTION

In this discussion it will, in the interest of simplicity, be assumed that the isotopes of an element such as natural uranium having only two isotopes are being separated. In the absence of selective excitation of the atoms, the isotope effect on condensation and evaporation is small so that the following relationship exists:

$$\frac{N^I}{N^{II}} = \frac{\psi^I}{\psi^{II}} = \left[\frac{C^I}{C^{II}}\right]_{INITIAL} \quad (6)$$

$N^I$ and $N^{II}$ are the respective densities in atoms per square centimeter of the deposited atoms of the isotopes I and II, $U^{235}$ and $U^{238}$. $\psi^I$ and $\psi^{II}$ are the respective fluxes for these atoms, and $C^I$ and $C^{II}$ are the respective concentrations of these atoms in the deposit.

After selective excitation of isotopes I and II, in the respective collectors 27 and 35 of FIG. 1, reevaporation during a time interval $t=d'/a\omega$ delivers to the collectors 27 and 35 numbers of atoms $n^I$ and $n^{II}$ respectively per cm$^2$ of substrate (drum) area:

$$n^I = N^I[1-\exp(-t/\tau^I)] \approx N^I t/\tau^I, \; t < \tau^I$$

$$n^{II} = N^{II}[1-\exp(-t/\tau^{II})] \approx N^{II} t/\tau^{II}, \; t < \tau^I < \tau^{II} \quad (7)$$

The terms on the right are a warrantable approximation.

The numbers of atoms $n^I$ and $n^{II}$ are proportional to the corresponding final concentrations $C^I$ and $C^{II}$. Equation 1 then becomes $$\alpha = \frac{n^I/n^{II}}{(C^I/C^{II})_{INITIAL}}$$

which becomes $$\frac{N^I t/\tau^I}{N^{II} t/\tau^{II}} \bigg/ \frac{N^I}{N^{II}}$$

since $N^I$ and $N^{II}$ are proportional to the initial concentrations $C^I$ and $C^{II}$ so that $$\alpha = (\tau^{II}/\tau^I) \quad (8)$$

Based on equation 4

$$\alpha \approx \exp(U_1/kT)$$

Figure 2:
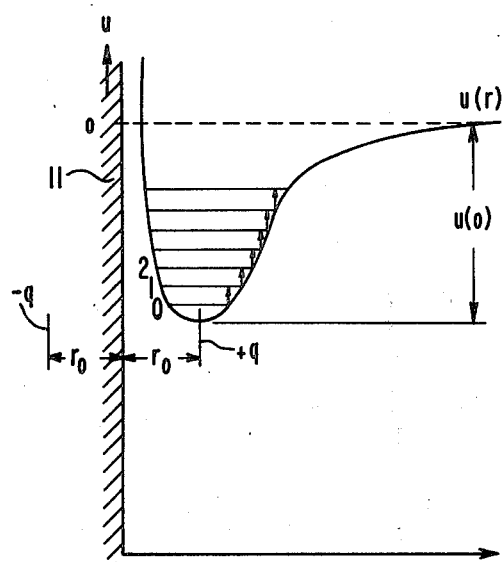
FIG. 2 is a graph showing the relationship between the potential energy of the particles with reference to the substrate and the distance of the particles from the substrate; i.e., from the plane defining the mean of the centers of mass of the molecules of the substrate.
Figure 3:
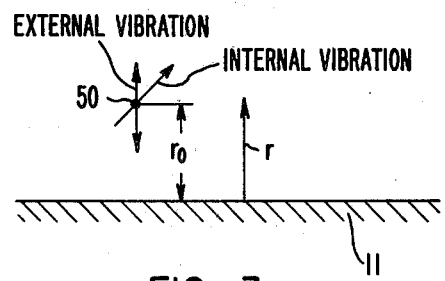
FIG. 3 is a diagrammatic view showing the relationship of the parameters involving the particles and the substrate.

It is now necessary to estimate atomic parameters. In this operation FIGS. 2 and 3 will be referred to. In FIG. 2 the potential energy U(r) acting on an isolated atom 50 of the deposit (adsorbed to substrate 11) is plotted as a function of the distance r of the center of mass of this atom from the substrate 11. U(r) is plotted vertically along the substrate 11, r is plotted horizontally perpendicular to the substrate. The horizontal lines in the curve represent the vibrational quantum levels of the adsorbed or deposited atom. The energy U(r) below the o axis is bonded energy; the energy U(r) above the o axis repulsive energy. The repulsive energy acts very near to the substrate 11. FIG. 3 shows the orientation of the particle vibration. The substrate 11 is shown as a plane in FIG. 3. Since the distance r is a distance of atomic magnitude, the surface shown as plane is actually the mean surface through the centers of masses of the molecules or atoms of the substrate at its surface. The atom 50 when unexcited oscillates or vibrates with a period $\tau_o$.

The forces acting on the atom 50 include a repulsive force and an attractive Coulomb force as shown in FIG. 3. The term U(r) may be expressed as follows:

$$U(r) = \frac{\gamma}{r^n} - \frac{q^2}{2r} \quad (9)$$

$\gamma$ and n are repulsive-term parameters characteristic of the atom and substrate under observation. The right-hand term $q^2/2r$ is based on the assumption of a partly ionic bond formed between an induced charge q at distance r from the substrate and its image (Reference 3). The equilibrium position satisfies the condition $$\frac{du}{dr}\bigg|r = r_o = o$$

and $\gamma$ can be expressed $$\gamma = \frac{q^2}{2n} r_o^{n-1} \quad (10)$$

The equilibrium potential then becomes:

$$U_o = U(r_o) = \frac{q^2}{2r_o}\left(\frac{1}{n} - 1\right) \quad (11)$$

The mass of the substrate may be warrantably assumed to be infinite so that the reduced mass of the oscillating atom is equal to m. The atom of mass m oscillates about the equilibrium position $r_o$.

The equation of motion for the vibrating atom is $$m\frac{d^2r}{dt^2} + G(r - r_o) = 0 \quad (12)$$

where G is defined by the frequency of vibration $$\nu_o = \frac{1}{\tau_o} = (G/m)^{\frac{1}{2}} \quad (13)$$

G is a force constant in dynes per cm, and is the curvature of the curve in FIG. 2 at the potential-energy minimum.

$$G = \frac{d^2U(r)}{dr^2}\bigg|_{r=r_o} = \frac{q^2}{r_o^3}\left(\frac{n-1}{2}\right) \quad (14)$$

Knowing the basis parameters n, q and $r_o$, a unique determination can be made of the bonding potential energy $U_o$, the oscillation period $\tau_o$ and, through Equation 2, the normal life time of the atom as a function of temperature T. In turn these parameters determine the critical dimensions and operation characteristics of the apparatus shown in FIG. 1.

For the purpose of an operating example, the following magnitudes, which are reasonable based on experimental results, are postulated:

n=7 q=½ e the electronic charge $r_o$=3 A, (Angstroms)

The following results flow from Equations (11), (14), (13) and (2):

$U_o$=0.82×10$^{-12}$ ergs—0.51 eV (electron Volts)  (15)

G=0.6×10$^4$ dyne/cm  (16)

$\tau_o$=1.6×10$^{-12}$ seconds  (17)

$\tau$=(1.6×10$^{-12}$) exp (5.9×10$^3$/T) seconds  (18)

In further developing the example of excitation of $U^{235}$ atoms at their bonding frequency according to Equation 17 is considered. This excitation requires a monochromatic coherent source at a wave length λ of 470 micrometers. A laser, maser or an electron-beam oscillator can provide radiation of this type at a stable frequency within about 0.1% of its peak magnitude. This excludes $U^{238}$ excitation. The substrate temperature is warrantably assumed to be 250° K. and the potential energy increase may be chosen as $U_1 = -0.2U_o$. This corresponds to 40 photons of 2.64 meV (million electron volts) in cascade. Based on these assumptions and equations 18, 4 and 8.

$\tau^I$=2.25×10$^{-4}$ sec. ($U^{235}$)  (19)

$\tau^{II}$=2.92×10$^{-2}$ sec. ($U^{238}$)  (20)

α=130  (21)

Selective molecular bond excitation (i.e. internal vibrational exciation) of $U^{235}$ molecules deposited on a substrate may also be considered. An increase of potential energy by $U_1$=0.1 eV corresponds to a single photon at 12 micrometers, close to some resonances of U-molecules. The results of equations (19) through (21) are then obtained again.

With respect to the apparatus shown in FIG. 1, typical widths d and d' for the deposits are about 1 cm. The deposits should be about 1 meter long axially. The slot 18 and sectors 19 and 27 should be dimensioned to achieve these deposits. The drum 11 may have a radius of about 10 cm and rotate at about 6000 RPM. The allowable flux density Ψ should be such that under these circumstances a sub-monatomic (molecular) layer of the deposit is formed on the drum.

$$\psi \leq \frac{\omega_a}{d} \cdot N_{cr} \quad (22)$$

$N_{cr}$ being the critical vapor flux density or,

Ψ≧6×10$^{17}$ per cm$^2$ per second  (23)

Here the critical density $N_{cr}$ is set at 10$^{14}$ per cm$^2$. Under these circumstances there is produced about 1 gram per hour of 50% enriched uranium (enriched in $U^{235}$) in one stage of operation of the apparatus shown in FIG. 1. The monochromatic power requirement is about 100 watts per meter length. Two stage operation would yield 99% enriched uranium.

While a preferred embodiment has been disclosed herein, many modifications thereof are feasible. This invention is not to be restricted except insofar as is necessitated by the spirit of the prior art.

I claim:

1. The method of deriving, from a first material a second material, said first material including an element having a plurality of isotopes, each isotope included in a different component of said material, said second material to be enriched in at least one of said isotopes, the said method comprising depositing said first material including said element at a subcritical surface density on a substrate, maintaining said substrate at a temperature just below the temperature at which the said first material escapes from said substrate, selectively irradiating said first material with monochromatic coherent radiation of a frequency resonant with the frequency of the component of said material including said one isotope to cause said second material including said one isotope to escape from said substrate, and collecting said escaping second material enriched in said one isotope.

2. The method of claim 1 including the steps of rotating said substrate, depositing said first material on a portion of said substrate when said portion reaches a first portion in the rotation of said substrate, irradiating said first material deposited in said first position when said portion reaches a second position in the rotation of said substrate to cause second material including the isotope to escape from said substrate, and collecting said escaping second material enriched in said isotope when said portion reaches a third position in the rotation of said substrate.

3. The method of claim 1 wherein the first material deposited is composed of the element.

4. The method of claim 1 wherein the first material deposited is composed of a compound of the element.

5. The method of claim 1 including the step of selectively irradiating the residual deposit, remaining after the second material including the isotope has escaped from the substrate, with monochromatic coherent radiation of another frequency, said other frequency being resonant with another isotope of the element to cause third material including said other isotope to escape from said substrate.

6. The method of claim 2 including the step of selectively irradiating the residual deposit left on the portion with monochromatic coherent radiation of another frequency, when said portion reaches a fourth position in the rotation of the substrate following the third position, said other frequency being resonant with another isotope of the element, whereby third material including said other isotope is caused to escape from said substrate.

7. The method of claim 5 including the step of collecting the third material enriched in the other isotope.

8. The method of claim 6 including the step of collecting the third material enriched in the other isotope in a fifth position of the portion.

9. The method of claim 5 wherein the element has only two isotopes and wherein the material including said element, starting with the first material, is repeatedly processed as defined in claim 5 to cause successive material enriched in one isotope to escape and then to cause other material than said last-named successive materials, enriched in the other isotope, to escape.

10. The method of deriving, from a first material a second material, said first material including an element having only two isotopes, each isotope included in a different component of said material, said second material to be enriched in at least one of said isotopes, the said method comprising depositing said first material including said element at a subcritical surface density on a substrate, maintaining said substrate at a temperature just below the temperature at which the first material escapes from said substrate, selectively irradiating said first material with monochromatic coherent radiation of a frequency resonant with the frequency of the component of said material including the other of said isotopes to cause said second material including said other of said isotopes to escape from said substrate, and collecting the residual material on said substrate enriched in said one isotope, by evaporating said residual material from said substrate.

11. The method of claim 1 wherein the frequency of the monochromatic coherent radiation is the frequency of the external vibration of the component of the first material, including the one isotope, relative to the substrate.

12. The method of claim 1 wherein the material is a compound of the element and the frequency of the monochromatic coherent radiation is the frequency of the internal vibration of the molecule of the component of the material including the one isotope.

* * * * *